United States Patent [19]
Dumbeck

[11] Patent Number: 4,915,020
[45] Date of Patent: Apr. 10, 1990

[54] RADON CONTROL IN DWELLINGS

[76] Inventor: Robert F. Dumbeck, P.O. Box 548, Elgin, Tex. 78621

[21] Appl. No.: 906,945

[22] Filed: Sep. 15, 1986

Related U.S. Application Data

[63] Continuation-in-part of Ser. No. 576,431, Feb. 2, 1984, abandoned.

[51] Int. Cl.[4] .............................................. F24F 7/00
[52] U.S. Cl. .......................................... 98/1.5; 78/345
[58] Field of Search ...................... 98/1.5, 33.1, 34.5, 98/32, 31

[56] References Cited

U.S. PATENT DOCUMENTS

| | | | |
|---|---|---|---|
| 2,282,210 | 5/1942 | Plum | 98/1.5 |
| 2,610,565 | 9/1952 | Stuart | 98/1.5 |
| 3,199,432 | 8/1965 | Brandi | 98/33.1 |
| 3,509,810 | 5/1970 | Riester | 98/1.5 |
| 3,665,836 | 5/1972 | Kubiak | 98/1.5 |
| 4,206,856 | 2/1977 | Nilsson | 98/31 X |
| 4,344,356 | 8/1982 | Casterson et al. | 98/1.5 X |
| 4,362,922 | 12/1982 | Anderson | 98/31 X |
| 4,457,214 | 7/1984 | de Vries | 98/1.5 |
| 4,467,706 | 8/1984 | Batcheller et al. | 98/1.5 |
| 4,483,273 | 11/1984 | Develle et al. | 98/1.5 X |

Primary Examiner—William E. Tapolcai
Attorney, Agent, or Firm—Laurence R. Brown; Alfred J. Mangels

[57] ABSTRACT

Air contamination from deficiency of oxygen and/or the presence of unhealthy amounts of radon gas in a dwelling is controlled by the simple expedient of providing fresh air flow through a dwelling under conditions that keep the internal dwelling pressure above atmospheric, thereby prevention the radon gas from percolating through the earth adjacent the dwelling walls and floors and into the interior of the dwelling.

5 Claims, 1 Drawing Sheet

RADON CONTROL IN DWELLINGS

This invention is a continuation-in-part of my co-pending application, U.S. Ser. No. 576,431, filed Feb. 2, 1984 for Control of Temperature and Humidity in Concrete Building Walls, now abandoned.

TECHNICAL FIELD

This invention relates to control of contaminated air in the interior living space of dwellings, and more particularly it relates to the control of Radon that tends to seep into dwellings from the earth through basement walls and the like.

BACKGROUND

Because of decaying radioactive materials in the earth radon gas is present in the earth over many parts of the world. It has been determined that over extensive areas of the United States, radon accumulates in dwellings at dangerous levels exceeding the four picocuries per liter of air standard set by the Environmental Protection Agency. That agency reports that radon at this level is a carcinogenic gas equal in health risk to smoking half a pack of cigarettes daily. Homes along the Triassic Basin in Virginia showed radon levels as high as 100 pCi/l, a comparable annual lung cancer risk to 20,000 chest X-rays.

Conventional methods of protecting homes against radon gas are both expensive and uncertain. Since the gas may seep into basements through sump pumps and cracks, all such sources are sealed up. This however does not account for seepage through cement joints or porous building block walls underground. Nor does it prevent other new cracks from developing, so that assurance against return of radon gas is not possible by these methods, which can be very expensive in terms of renovation and repair. Also venting of basements and the like has been a conventional technique for removing accumulated radon out into the atmosphere, where it becomes so dilute that it is not a serious threat to human health.

A further problem confronting radon gas control in modern housing is the tendency to seal up the dwelling from escape of heat and air, and the lack of circulation of fresh air through the dwelling. This contributes to even greater concentration of radon gas, which tends to be held in fabrics and dust after it enters a dwelling, so that its removal by complete venting and replacement of air is inconsistent with present day homeowner psychology.

There are no known methods heretofore that can give assurance of radon gas protection, and particularly at relatively nominal capital outlays. It is therefore an objective of this invention to provide improved means and methods for control of radon gas in dwellings to assure that concentrations levels are in an acceptable range.

DISCLOSURE OF THE INVENTION

It has been determined that the radon gas escapes from the earth at pressures above atmospheric, probably in some cases from deep within the earth where pressures are high. Jets may be likened to geysers where there are fissures in the earth's crust. When percolated through soil, there is a tendency to concentrate in worked over and thus more porous soil about the foundations of houses. The greater the surface area of underground walls, the greater the risk of radon entry.

Control of the seepage of the radon into the dwelling is made possible by this invention, not by sealing up the fissures or walls through which it may seep, but by entirely eliminating the tendency for the radon to enter the dwelling. Thus, as the radon gets closer to the earth's surface its pressure becomes closer to atmospheric. However, it requires a greater than atmospheric pressure to force it into the atmosphere. Therefore this invention operates on the principle that if the pressure inside the dwelling is continuously maintained at a pressure above atmospheric, the radon gas will not enter the dwelling, but will find alternative paths to escape harmlessly into the atmosphere.

Accordingly radon control means may be as simple as a fan or blower and a pressure sensitive control, such as a biased vent to the outside atmosphere from a relatively sealed dwelling, thereby to keep the pressure within the dwelling continuously above atmospheric pressure. Normally because of fireplace chimneys, occasionally opened doors, and the like, pressure inside a house is not maintained above atmospheric. Thus, the higher pressure radon gas tending to escape into the atmosphere does not avoid the interior of a dwelling. However this invention provides means and methods of control of radon gas in dwellings by maintaining the internal dwelling pressure above atmospheric.

BRIEF DESCRIPTION OF THE DRAWINGS

In the drawings, wherein like reference characters designate similar features throughout the various views to facilitate comparison.

THE PREFERRED EMBODIMENTS

Figure 1:
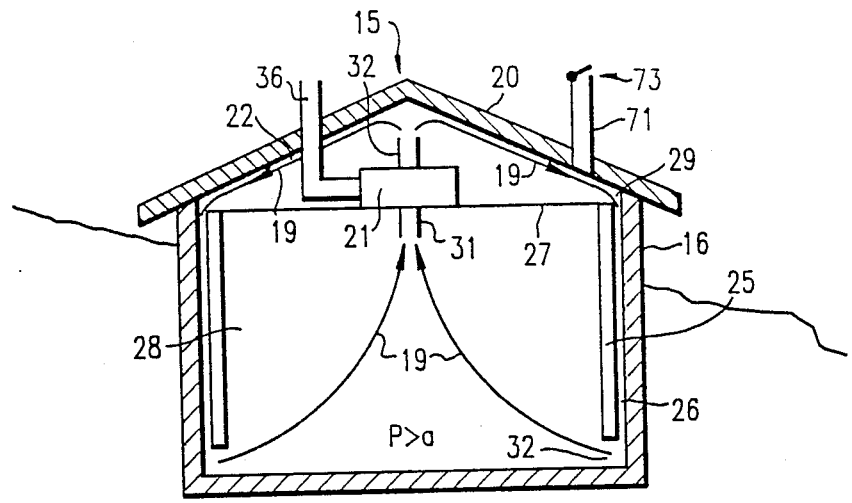
FIG. 1 is a diagrammatic sketch of a dwelling, showing significant wall surfaces in contact with the earth.

In FIG. 1 is shown a house or dwelling 15, which has outside walls 16, such as concrete or building block, to a substantial extent in contact with the earth under the ground surface 17. A blower 21 is installed for circulating air through the dwelling in a pattern of air flow designated by arrows 19. Fresh air is taken in from the atmosphere at inlet pipe 36 and outlet air is vented at pipe 71.

It is noted that the pressure within the dwelling is maintained above atmospheric by the blower 21 with the aid of the biased vent opening 73 which does not vent air into the outside atmosphere until the atmospheric pressure is exceeded by a predetermined amount that exceeds the pressure at which the radon gas is being percolated through the earth about the outer walls 16. Thus a simple fan-blower 21 can both maintain a protective pressure against entry of radon gas, and can circulate air for temperature control, and can assure that enough fresh air is entered into the dwelling to prevent any danger of oxygen deficiency as a health hazard, and can discharge air within the dwelling that comes from the areas adjacent the walls out the vent pipe 71 to tend to remove any radon gas that might be present within the dwelling.

Note that by scrubbing the outer walls with the air flow path 19, the recirculated air returning to the attic vent pipe will tend to discharge radon gas, even though it would otherwise tend to accumulate in the lower part of the dwelling adjacent the walls which would let it seep in from the earth outside. The blower speed may be controlled for the amount of fresh air drawn in and vented.

Figure 2:
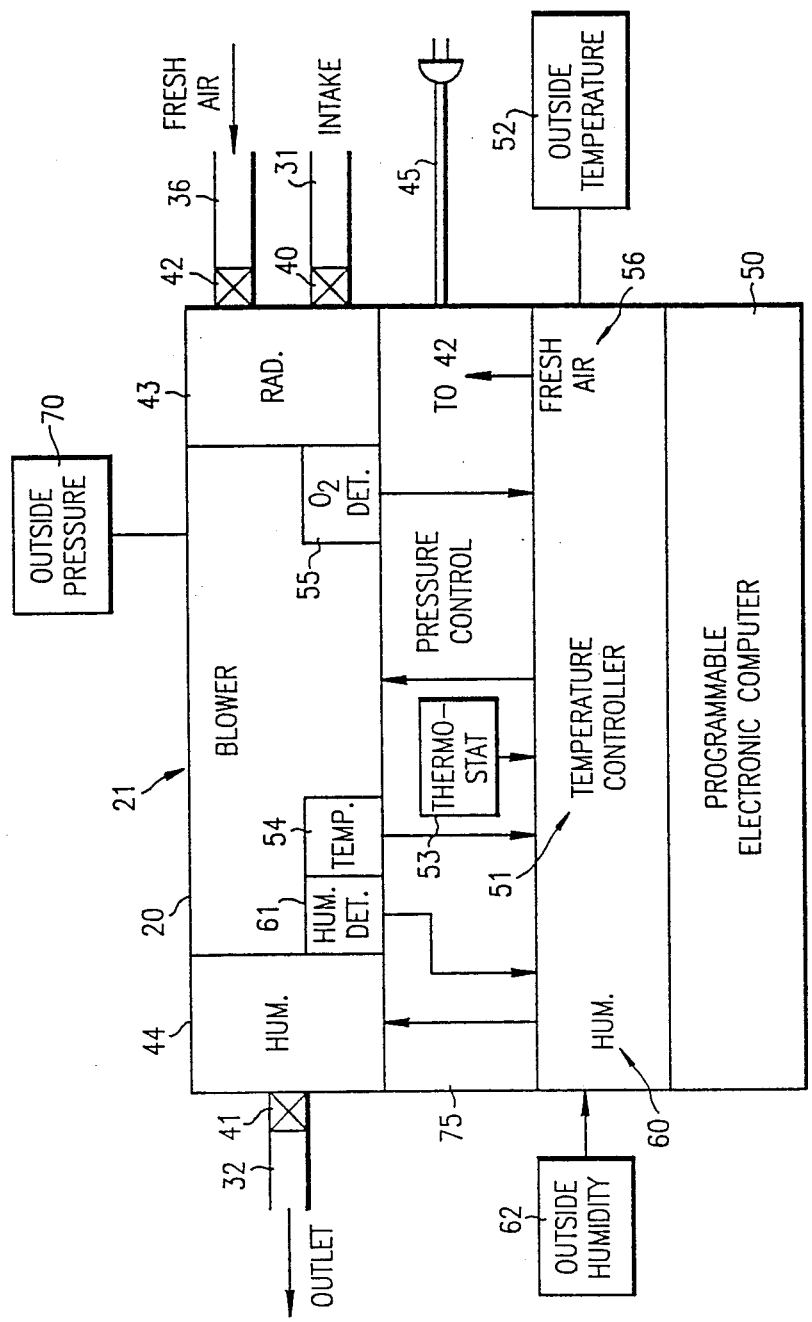
FIG. 2 is a block diagram of an electronic computer controlled air conditioning system permitting fresh air circulation through a dwelling.

The electronic computer controlled air conditioning system of FIG. 2 is a more sophisticated fan control system operable in the manner hereinbefore described, but affording automatic control of the air contamination, temperature 51, humidity 60 and pressure 70. Thus the computer 50 is responsive to sensors of temperature 52, 54, humidity 61, 62, oxygen 55 and atmospheric pressure 70 to attain interior dwelling conditions established by the computer programming preferences and the setting of thermostat 53. Thus a single unit put in a wall or window can provide complete control of the air contamination and comfort index.

In this unit, the computer is programmed to control the outlet pipe 32 valve 41 in response to sensed external pressure 70 compared to internal pressure 75 to assure that the pressure 75 inside the dwelling is sufficiently above the prevailing outside pressure 70 to prevent radon gas from entering the dwelling through any porous entry positions in the underground wall or floor areas. The other comprehensive control features are set forth in the above identified parent application.

Figure 3:
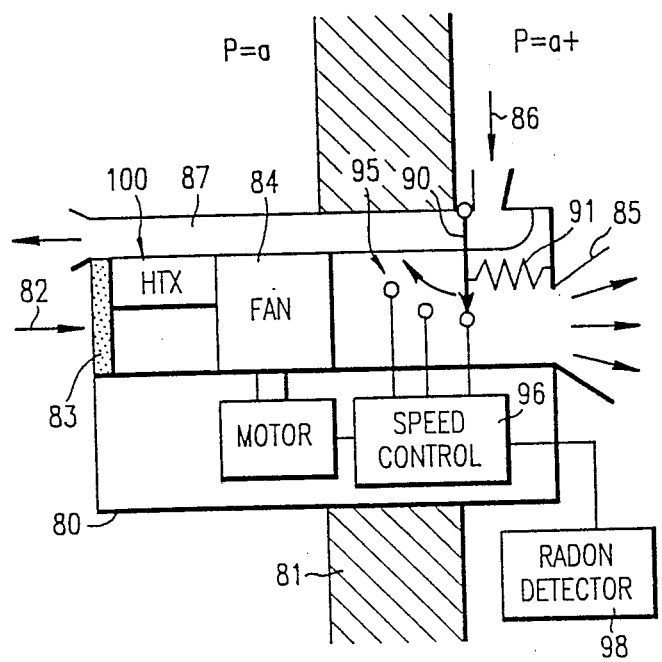
FIG. 3 is a sketch of a simplified motor controlled fan or blower for controlling the flow of fresh outside air into a dwelling.

The FIG. 3 embodiment diagrammatically shows a very low cost simplified contaminated air control system for a dwelling, which effectively controls excessive radon gas. This is effected in part by entry of fresh outside air and removal of interior air contaminated by radon gas presence or oxygen deficiency, and in part by the pressure (a+) inside the dwelling being greater than the outside atmospheric pressure.

The housing 80 is shown in a dwelling wall 81, with the outside wall being to the left. Thus fresh incoming air 82 may be drawn through filter 83 for removal of dust, etc. if desired, by the motor driven fan 84, and passed out louvres 85 into the interior of the dwelling. Conversely stale exhaust air 86 may be forced out of exhaust pipe 87, when the internal air pressure is great enough to overcome the bias of pivotable flap valve 90 provided by the spring 91 or other pressure differential determining mechanism.

In this manner it is assured that the fan or blower 84 will keep the pressure (p) inside the dwelling above the atmospheric outside pressure (a). This can simply be done with a continuously running fan 84. To control fan energy and speed, the flap valve 90 may carry a switching system 95 to effect fan speed control by conventional control means 96. The flap valve 90 is a simple pressure differential sensor that can be replaced with other sensors and control means which likewise sense the relative pressure of the arir inside and outside the dwellings and sets threshold conditions (such as the bias of spring 91) for keeping the pressure inside the dwelling at a level at least equal to the outside atmospheric pressure and preferably above it at all times. Even when outside or inside pressure changes drastically, such as with a fire in the furnace emitting hot air through the chimney or with the presence of a storm or high pressure barometric weather condition, this simple system will assure enough inside pressure to prevent undesired radon gas from seeping in from the earth adjacent the dwelling floor or wall areas. The radon detector 98 is optional for speed control of the fan 84, or adjustment of the pressure differential difference of the flap valve 90, to assure increased pressure inside the dwelling and increased fresh air exchange should conditions occur that caused the presence of radon gas, such as underground disturbances, earthquakes or the like, dryness affecting the percolation of radon through the earth, cracks or fissures developing in the walls or floors adjacent the earth, etc.

Note that the heat exchanger 100 is used if the energy of the exhaust air in channel 87 is to be conserved to heat the incoming air 82.

The radon detector 98, if used should detect any radon gas presence above four picocuries per liter of air and activate the pressure control system accordingly. In general, the system of FIG. 3 does not require the radon detector and its control function to be effective, and the cost of the system is so little compared with structural overhaul or other prior art solutions, that the system may be installed in areas where radon gas is likely to be encountered, or in dwellings when radon has been detected.

Having therefore improved the state of the art, those novel features descriptive of the nature and spirit of the invention are set forth in particularity in the claims which follow.

I claim:

1. The method of combatting entrance of radon contamination through radon porous walls into the interior living space of a dwelling at levels that are dangerous to human health, comprising the steps of:
   introducing fresh outside ambient atmospheric air into the dwelling by means of an electric blower,
   determining a differential pressure of the air outside and inside the dwelling bearing upon said porous walls sufficient to prevent seepage of radon gas into the dwelling through said radon porous walls,
   removing air from the interior living space replaced by the fresh outside air in response to said differential pressure while maintaining the pressure inside the dwelling sufficient to prevent the radon seepage into the dwelling, and
   maintaining the pressure on said walls inside the dwelling by the blower at a level that diverts radon outside the dwelling adjacent said walls away from the dwelling thereby constituting the operational step of eliminating contamination by preventing seepage of radon gas into the dwelling through said walls.

2. The method of claim 1 including the
   more detailed step of removing air from the dwelling comprising scrubbing the outer randon porous dwelling walls adjacent the earth with an air flow path thereby to tend to remove with the air removed from the dwelling any radon gas that might penetrate the walls.

3. Apparatus for reducing radon gas concentration within a dwelling seeping thereinto through radon porous dwelling walls from the earth adjacent to the dwelling to a level of less than four picocuries per liter of air comprising in combination,
   blower means, and
   control means for operating the blower as a function of varying ambient pressures outside the dwelling for forcing fresh air into the dwelling to establish and maintain air pressure within the dwelling on said walls sufficiently greater than outside ambient air pressure to thereby constitute means for preventing seepage of radon gas through the walls into the dwelling from the earth adjacent the dwelling at a concentration above said level, a housing for installation through a wall of said dwelling which contains said blower means.

an outlet path through said housing for removal of the air in response to the blower means.

means operable to differential pressure sensing means effecting a control signal when the air pressure within the dwelling exceeds the ambient air pressure outside the dwelling enough to insure reduction of seepage of radon through dwelling walls thereby to remove air through said outlet path, and means for operating the blower in response to the control signal to maintain the pressure within the dwelling sufficient to prevent the radon gas concentration in the dwelling above said level.

4. Apparatus as defined in claim 3 including means in said outlet path passing air to be removed by the outer walls adjacent the earth thereby to tend to remove any radon gas that might penetrate the walls.

5. Apparatus for reducing radon gas concentration within a dwelling seeping thereinto through radon porous dwelling walls from the earth adjacent to the dwelling to a level of less than four picocuries per liter of air comprising in combination, blower means, and control means for operating the blower as a function of varying ambient pressures outside the dwelling for forcing fresh air into the dwelling to establish and maintain air pressure within the dwelling on said walls sufficiently greatly than outside ambient air pressure to thereby constitute means for preventing seepage of radon gas through the walls into the dwelling from the earth adjacent the dwelling at a concentration above said level.

wherein adjacent channels provide for inlet of introduced air and outlet of removed air from the dwelling and heat exchange means is commonly provided therebetween to modify incoming air temperature with the temperature of the removed air.

* * * * *